(12) United States Patent
Ogawa et al.

(10) Patent No.: US 6,581,564 B2
(45) Date of Patent: Jun. 24, 2003

(54) IGNITION TIME CONTROLLER, IGNITION TIME CONTROL METHOD AND ENGINE CONTROL UNIT FOR INTERNAL COMBUSTION ENGINE

(75) Inventors: Ken Ogawa, Saitama-ken (JP); Kazuhiro Ueda, Saitama-ken (JP); Hiroshi Tagami, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 79 days.

(21) Appl. No.: 09/963,120

(22) Filed: Sep. 20, 2001

(65) Prior Publication Data

US 2002/0033164 A1 Mar. 21, 2002

(30) Foreign Application Priority Data

Sep. 21, 2000 (JP) .......................................... 2000-287631

(51) Int. Cl.⁷ ................................................ F02B 17/00
(52) U.S. Cl. .................................. 123/295; 123/406.47
(58) Field of Search ................................ 123/295, 305, 123/90.15–90.17, 681, 406.19, 406.23, 406.47

(56) References Cited

U.S. PATENT DOCUMENTS 5,666,916 A * 9/1997 Fujieda et al. ............... 123/295
6,330,869 B1 * 12/2001 Yoshiki et al. ............. 123/90.15
6,390,056 B1 * 5/2002 Hertzberg et al. .......... 123/295

* cited by examiner

Primary Examiner—Andrew M. Dolinar
Assistant Examiner—Arnold Castro
(74) Attorney, Agent, or Firm—Lahive & Cockfield, LLP

(57) ABSTRACT

An ignition time controller for an internal combustion engine is provided for setting an ignition time such that it can rapidly converge to an appropriate value in accordance with a change in intake characteristics associated with a change in cam phase in either of a uniform combustion mode and a stratified combustion mode in a direct injection type internal combustion engine having a cam phase changing mechanism. The ignition time controller comprises a required torque determining unit for determining a required torque outputted by the internal combustion engine based on an engine rotational speed and an accelerator opening, a fuel injection time determining unit for determining a time at which a fuel is injected into a cylinder, a basic ignition time determining unit for determining a basic ignition time based on the engine rotational speed and the required torque in the uniform combustion mode and based on the engine rotational speed and the fuel injection time in the stratified combustion mode, and a basic ignition time correcting unit for correcting the basic ignition time in accordance with a cam phase deviation between an actual cam phase and a target cam phase.

24 Claims, 6 Drawing Sheets

IGNITION TIME CONTROLLER, IGNITION TIME CONTROL METHOD AND ENGINE CONTROL UNIT FOR INTERNAL COMBUSTION ENGINE

BACKGROUND OF THE INVENTION

1. Field of the Invention

The present invention relates generally to an ignition time controller, an ignition time control method and engine control unit for an internal combustion engine, and more particularly, to an ignition time controller, an ignition time control method and an engine control unit for an internal combustion engine which has a cam phase changing mechanism for changing the cam phase of at least one of an intake cam for opening/closing an intake valve and an exhaust cam for opening/closing an exhaust valve to reach a target cam phase so that the engine is operated in a combustion mode switched between a uniform combustion mode which performs fuel injection during an intake stroke and a stratified combustion mode which performs fuel injection in a compression stroke.

2. Description of the Prior Art

A conventional ignition time controller for an internal combustion engine of the type mentioned above is known, for example, from Laid-open Japanese Patent Application No. 9-209895. An internal combustion engine described in this document comprises a cam phase changing mechanism which changes the phase of an intake cam (hereinafter referred to as the "cam phase") with respect to a crank shaft. The cam phase is controlled to reach a target cam phase, as a target value, to change a valve timing of an intake valve, i.e., overlapping of the intake valve with an exhaust valve, and so on, thereby controlling the intake characteristics represented by a filling efficiency, and internal EGR. The target cam phase is determined based on the engine rotational speed and a load (an intake air mass per rotation of the engine). Also, this controller determines a basic ignition time based on the engine rotational speed and load, calculates a cam phase deviation which indicates the amount of deviation of an actual cam phase from the target cam phase, and determines a correcting amount for the basic ignition time based on the engine rotational speed, load and cam phase deviation.

Also, a recent internal engine, known as a direct injection type, directly injects a fuel into a cylinder, and is operated in a combustion mode which is switched between a uniform combustion mode and a stratified combustion mode in order to improve the fuel economy (see, for example, Laid-open Japanese Patent Application No. 11-22508). In this internal combustion engine, the stratified combustion mode is performed during an extremely low load operation such as idling, wherein a fuel injection is performed during an intake stroke with a throttle valve being substantially fully opened to supply a large amount of intake air into a cylinder for burning at an extremely leaner air/fuel ratio than the stoichiometric air/fuel ratio. On the other hand, the uniform combustion mode is performed during operations other than the extreme low load operation, wherein a fuel injection is performed during a compression stroke, and a throttle valve opening is controlled in accordance with the engine rotational speed and load to control the amount of intake air for burning at a richer air/fuel ratio than in the stratified combustion mode.

As described above, the conventional ignition time controller employs the intake air mass per rotation of engine as representative of the load which is relied on as a parameter to determine a basic ignition time. On the other hand, the load varies as the actual cam phase of the cam phase changing mechanism varies to cause a change in the filling efficiency, amount of intake air, and so on. As a result, this ignition time controller suffers from a delay in convergence of the ignition time to an optimal value due to the continuously fluctuating basic ignition time resulting from the varying actual cam phase, and therefore encounters difficulties in setting at all times an optimal ignition time in accordance with an engine operating condition.

This problem is particularly prominent when the ignition time controller is employed in the aforementioned direct injection type internal combustion engine, and particularly, when the engine is operated in the stratified combustion mode. Specifically, as described above, since the combustion is performed in an extremely lean air/fuel ratio in the stratified combustion mode, the fuel is inherently more difficult to burn in the stratified combustion mode than the uniform combustion mode. For this reason, if the ignition time delays in convergence to an optimal value, particularly, in the stratified combustion mode, the combustion state is more likely to deteriorate, thereby resulting in lower operability and exhaust gas characteristics.

OBJECT AND SUMMARY OF THE INVENTION

The present invention has been made to solve the problem as mentioned above, and its object is to provide an ignition time controller, an ignition time control method and an engine control unit for an internal combustion engine which are capable of setting an ignition time to an optimal value in accordance with a change in intake characteristics associated with a change in cam phase such that the ignition time rapidly converges to the optimal value in either of the uniform combustion mode and the stratified combustion mode in a direct injection type internal combustion engine having a cam phase changing mechanism.

To achieve the above object, according to a first aspect of the present invention, there is provided an ignition time controller for an internal combustion engine equipped with a cam phase changing mechanism for changing a cam phase with respect to a crank shaft for at least one of an intake cam for opening/closing an intake valve and an exhaust cam for opening/closing an exhaust valve such that the cam phase reaches a target cam phase, so that the engine is operated in a combustion mode switched between a uniform combustion mode in which a fuel is injected into a cylinder during an intake stroke and a stratified combustion mode in which a fuel is injected into a cylinder in a compression stroke.

The ignition time controller according to the first aspect of the present invention is characterized by comprising engine rotational speed detecting means for detecting a rotational speed of the internal combustion engine; accelerator pedal opening detecting means for detecting an opening of an accelerator pedal; required torque determining means for determining a required torque outputted by the internal combustion engine based on the detected engine rotational speed and accelerator pedal opening; fuel injection time determining means for determining a time at which a fuel is injected into the cylinder; basic ignition time determining means for determining a basic ignition time based on the engine rotational speed and the determined required torque when the engine is in the uniform combustion mode, and for determining the basic ignition time based on the engine rotational speed and the determined fuel injection time when the engine is in the stratified combustion mode; actual cam phase detecting means for detecting an actual cam phase; and ignition time correcting means for correcting the basic ignition time in accordance with a cam phase deviation which is a difference between the detected actual cam phase and the target cam phase.

The internal combustion engine is operated in a combustion mode switched between the uniform combustion mode in which a fuel is injected into a cylinder in an intake stroke and the stratified combustion mode in which the fuel is injected in a compression stroke. Also, according to the ignition time controller in the first aspect of the present invention, the basic ignition time is determined based on the engine rotational speed and required torque in the uniform combustion mode. Since the required torque is determined as a torque outputted by the internal combustion engine based on the engine rotational speed and accelerator opening, the required torque reflects an actual load, and is not affected directly by a change, if any, in the intake characteristics such as a filling efficient associated with a change in cam phase of the cam phase changing mechanism, so that the required torque presents an extremely small amount of fluctuations due to such a change. Therefore, in the uniform combustion mode, the basic ignition time can be appropriately set in accordance with the required torque, i.e., the load, in a stable manner without significantly affected by a change in the intake characteristics associated with a change in the cam phase.

On the other hand, in the stratified combustion mode, the basic ignition time is determined based on the engine rotational speed and the fuel injection time. In the stratified combustion mode, the ignition time must be accurately set in coincidence with a time at which an air/fuel mixture exists near an ignition plug because the fuel is injected in a compression stroke. Thus, the basic ignition time can be appropriately set by determining the same based on an actual fuel injection time. Also, since the fuel injection time is not either affected directly by a change in the intake characteristics associated with a change in the cam phase, the basic ignition time can be stably and appropriately set in the stratified combustion mode.

Also, the basic ignition time determined as described above is corrected in accordance with the cam phase deviation between the actual cam and the target cam, so that an optimal ignition time can be set corresponding to the actual intake characteristics. Thus, according to the ignition time controller of the present invention, the basic ignition time can be stably and appropriately set without significantly affected by a change in the intake characteristics associated with a change in the cam phase, and the basic ignition time is corrected in accordance with the cam phase deviation, thereby making it possible to set the ignition timing such that it rapidly converges to an optimal value in accordance with the change in the intake characteristics associated with the change in the cam phase.

To achieve the above object, according to a second aspect of the present invention, there is provided an ignition time controller for an internal combustion engine equipped with a cam phase changing mechanism for changing a cam phase with respect to a crank shaft for at least one of an intake cam for opening/closing an intake valve and an exhaust cam for opening/closing an exhaust valve such that the cam phase reaches a target cam phase, so that the engine is operated in a combustion mode switched between a uniform combustion mode in which a fuel is injected into a cylinder during an intake stroke and a stratified combustion mode in which a fuel is injected into a cylinder in a compression stroke.

The ignition time controller according to the second aspect of the present invention is characterized by comprising an engine rotational speed detecting module for detecting a rotational speed of the internal combustion engine; an accelerator pedal opening detecting module for detecting an opening of an accelerator pedal; a required torque determining module for determining a required torque outputted by the internal combustion engine based on the detected engine rotational speed and accelerator pedal opening; a fuel injection time determining module for determining a time at which a fuel is injected into the cylinder; a basic ignition time determining module for determining a basic ignition time based on the engine rotational speed and the determined required torque when the engine is in the uniform combustion mode, and for determining the basic ignition time based on the engine rotational speed and the determined fuel injection time when the engine is in the stratified combustion mode; an actual cam phase detecting module for detecting an actual cam phase; and ignition time correcting module for correcting the basic ignition time in accordance with a cam phase deviation which is a difference between the detected actual cam phase and the target cam phase.

This ignition time controller provides the same advantageous effects as described above concerning the ignition time controller according to the firs aspect of the present invention.

To achieve the above object, according to a third aspect of the present invention, there is provided an ignition time control method for an internal combustion engine equipped with a cam phase changing mechanism for changing a cam phase with respect to a crank shaft for at least one of an intake cam for opening/closing an intake valve and an exhaust cam for opening/closing an exhaust valve such that the cam phase reaches a target cam phase so that the engine is operated in a combustion mode switched between a uniform combustion mode in which a fuel is injected into a cylinder during an intake stroke and a stratified combustion mode in which a fuel is injected into a cylinder in a compression stroke.

The ignition time control method according to the third aspect of the present invention is characterized by comprising the steps of detecting a rotational speed of the internal combustion engine; detecting an opening of an accelerator pedal; determining a required torque outputted by the internal combustion engine based on the detected engine rotational speed and accelerator pedal opening; determining a time at which a fuel is injected into the cylinder; determining a basic ignition time based on the engine rotational speed and the determined required torque when the engine is in the uniform combustion mode, and determining the basic ignition time based on the engine rotational speed and the determined fuel injection time when the engine is in the stratified combustion mode; detecting an actual cam phase; and correcting the basic ignition time in accordance with a cam phase deviation which is a difference between the detected actual cam phase and the target cam phase.

This control method provides the same advantageous effects as described above concerning the ignition time controller according to the firs aspect of the present invention.

To achieve the above object, according to a fourth aspect of the present invention, there is provided an engine control unit including a control program for causing a computer to carry out ignition time control for an internal combustion engine equipped with a cam phase changing mechanism for changing a cam phase with respect to a crank shaft for at least one of an intake cam for opening/closing an intake valve and an exhaust cam for opening/closing an exhaust valve such that the cam phase reaches a target cam phase so that the engine is operated in a combustion mode switched between a uniform combustion mode in which a fuel is injected into a cylinder during an intake stroke and a stratified combustion mode in which a fuel is injected into a cylinder in a compression stroke.

The engine control unit according to the fourth aspect of the present invention is characterized in that the control program causes the computer to detect a rotational speed of the internal combustion engine; detect an opening of an accelerator pedal; determine a required torque outputted by the internal combustion engine based on the detected engine rotational speed and accelerator pedal opening; determine a time at which a fuel is injected into the cylinder; determine a basic ignition time based on the engine rotational speed and the determined required torque when the engine is in the uniform combustion mode, and determining the basic ignition time based on the engine rotational speed and the determined fuel injection time when the engine is in the stratified combustion mode; detect an actual cam phase; and correct the basic ignition time in accordance with a cam phase deviation which is a difference between the detected actual cam phase and the target cam phase.

This engine control unit provides the same advantageous effects as described above concerning the ignition time controller according to the firs aspect of the present invention.

Preferably, in the ignition time controller, the basic ignition time correcting means includes advance direction correcting means for correcting the basic ignition time in an advance direction when the cam phase deviation is larger than an upper limit predetermined value.

With this configuration, the basic ignition time is corrected in the advance direction when the cam phase deviation is larger than the upper limit predetermined value, i.e., when the actual cam phase deviates in the advance direction with respect to the target cam phase, so that the ignition time can be more appropriately set corresponding to the direction of actual deviation of the cam phase. Also, since the basic ignition time is corrected only when the cam phase difference is larger than the upper limit predetermined value, i.e., when the amount of actual deviation of the cam phase is large, the stability of the ignition time can be maintained.

Also, preferably, in the ignition time controller, the basic ignition time correcting module includes an advance direction correcting module for correcting the basic ignition time in an advance direction when the cam phase deviation is larger than an upper limit predetermined value.

This preferred embodiment of the ignition time controller provides the same advantageous effects as provided by the corresponding preferred embodiment of the ignition time controller.

Also, preferably, in the ignition time control method, the step of correcting the basic ignition time includes correcting the basic ignition time in an advance direction when the cam phase deviation is larger than an upper limit predetermined value.

This preferred embodiment of the control method provides the same advantageous effects as provided by the corresponding preferred embodiment of the ignition time controller.

Also, preferably, in the engine control unit, when the control program causes the computer to correct the basic ignition time, the control program causes the computer to correct the basic ignition time in an advance direction when the cam phase deviation is larger than an upper limit predetermined value.

This preferred embodiment of the engine control unit provides the same advantageous effects as provided by the corresponding preferred embodiment of the ignition time controller.

Also, preferably, in the ignition time controller, the basic ignition time correcting means includes retard direction correcting means for correcting the basic ignition time in a retard direction when the cam phase deviation is smaller than a lower limit predetermined value.

With this configuration, the basic ignition time is corrected in the retard direction when the cam phase deviation is smaller than the lower limit predetermined value, i.e., when the actual cam phase deviates in the retard direction with respect to the target cam phase, so that the ignition time can be more appropriately set corresponding to the direction of actual deviation of the cam phase, and the stability of the ignition time can be maintained, as is the case with the control of the ignition time when the cam phase deviates in the advance direction.

Also, preferably, in the ignition time controller, the basic ignition time correcting module includes a retard direction correcting module for correcting the basic ignition time in a retard direction when the cam phase deviation is smaller than a lower limit predetermined value.

This preferred embodiment of the ignition time controller provides the same advantageous effects as provided by the corresponding preferred embodiment of the ignition time controller.

Also, preferably, in the ignition time control method, the step of correcting the basic ignition time includes correcting the basic ignition time in a retard direction when the cam phase deviation is smaller than a lower limit predetermined value.

This preferred embodiment of the control method provides the same advantageous effects as provided by the corresponding preferred embodiment of the ignition time controller.

Also, preferably, in the engine control unit, when the control program causes the computer to correct the basic ignition time, the control program causes the computer to correct the basic ignition time in a retard direction when the cam phase deviation is smaller than a lower limit predetermined value.

This preferred embodiment of the engine control unit provides the same advantageous effects as provided by the corresponding preferred embodiment of the ignition time controller.

Further, preferably, in the ignition time controller, the basic ignition time correcting means corrects the basic ignition time with different correcting amounts when the engine is in the uniform combustion mode and when the engine is in the stratified combustion mode.

Generally, the ignition time is largely affected by a change in internal EGR amount and effective compression ratio associated with a change in the cam phase in the uniform combustion mode, whereas the ignition time is less affected by the cam phase but rather largely affected by a fuel injection time in the stratified combustion mode. Therefore, according to the present invention, in the uniform combustion mode and the stratified combustion mode, the basic ignition time is corrected using a correcting amount adapted to the characteristics of the respective modes, so that the ignition time can be more appropriately set.

Further, preferably, in the ignition time controller, the basic ignition time correcting module corrects the basic ignition time with different correcting amounts when the engine is in the uniform combustion mode and when the engine is in the stratified combustion mode.

This preferred embodiment of the ignition time controller provides the same advantageous effects as provided by the corresponding preferred embodiment of the ignition time controller.

Further, preferably, in the ignition time control method, the step of correcting the basic ignition includes correcting the basic ignition time with different correcting amounts when the engine is in the uniform combustion mode and when the engine is in the stratified combustion mode.

This preferred embodiment of the control method provides the same advantageous effects as provided by the corresponding preferred embodiment of the ignition time controller.

Further, preferably, in the engine control unit, when the control program causes the computer to correct the basic ignition time, the control program causes the computer to correct the basic ignition time with different correcting amounts when the engine is in the uniform combustion mode and when the engine is in the stratified combustion mode.

This preferred embodiment of the engine control unit provides the same advantageous effects as provided by the corresponding preferred embodiment of the ignition time controller.

Furthermore, the engine includes a fuel injection valve for injecting the fuel which is disposed in a central portion of a top wall of a combustion chamber of the cylinder for injecting the fuel toward a recess formed in a piston.

According to this preferred embodiment, the advantageous effects provided by the ignition time controller and the ignition time control method according to the first and second embodiments of the invention and their preferred embodiments described above can be obtained in an optimized manner.

The above and other objects, features, and advantages of the present invention will become more apparent from the following detailed description taken in conjunction with the accompanying drawings.

DETAILED DESCRIPTION OF THE EMBODIMENT

Figure 1:
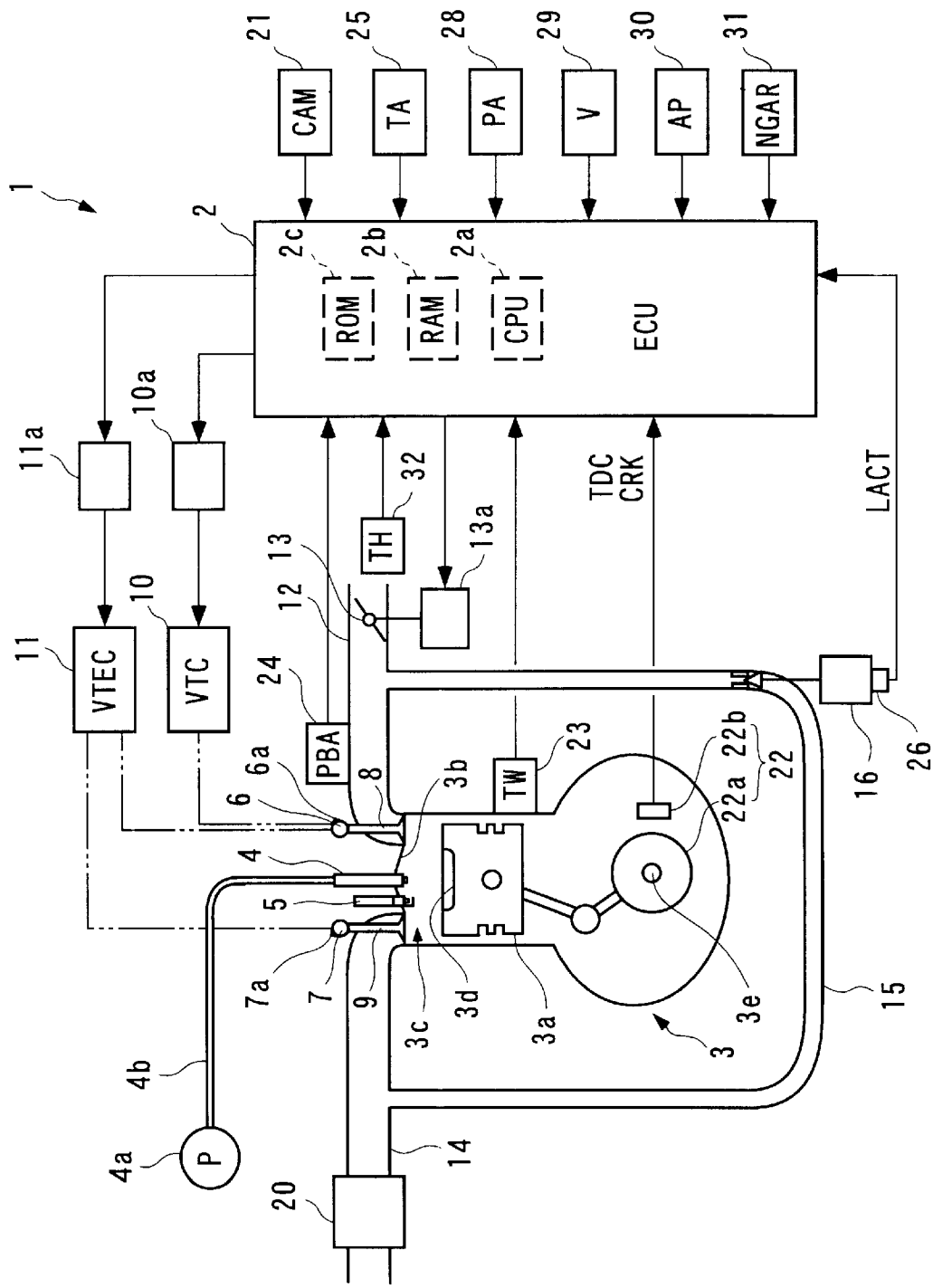
FIG. 1 is a block diagram generally illustrating the configuration of an ignition time controller for an internal combustion engine according to one embodiment of the present invention.

In the following, an ignition time controller for an internal combustion engine according to one embodiment of the present invention will be described with reference to the accompanying drawings. FIG. 1 generally illustrates the configuration of the ignition time controller according to this embodiment and an internal combustion engine in which the ignition time controller is applied.

The internal combustion engine (hereinafter referred to as the "engine") 3 is a straight four-cylinder DOHC type gasoline engine (only one cylinder is shown) which is equipped in a vehicle, not shown. A combustion chamber 3c is formed between a piston 3a and a cylinder head 3b of each cylinder, and a recess 3d is formed in a central portion of the top surface of the piston 3a. The combustion chamber 3c is provided with a fuel injection valve (hereinafter referred to as the "injector") 4 and an ignition plug 5. The injector 4 is directed to the recess 3d. Thus, the engine 3 is of a direct injection type which directly injects a fuel into the combustion chamber 3c.

The injector 4 is disposed in a central portion of the top wall of the combustion chamber 3c. The fuel is pumped by a fuel pump 4b through a fuel pipe 4a, and regulated at a predetermined pressure by a regulator (not shown), before it is supplied to the injector 4. With the foregoing configuration, the fuel is injected from the injector 4 toward the recess 3d of the piston 3a, strikes the recess 3d to form a fuel jet stream, or diffused in the combustion chamber 3c. A fuel injection period Tout and a fuel injection time (an injection start timing and an injection end timing IJLOGD) of the injector 4 are controlled by driving signal from an electric control unit (ECU) 2, later described.

The ignition plug 5 is applied with a high voltage by a driving signal from the ECU 2 at a timing in accordance with a ignition time IG, and then shut off to discharge, causing an air-fuel mixture to burn in the combustion chamber 3c.

An intake cam shaft 6 and an exhaust cam shaft 7 of the engine 3 are provided with a plurality of intake cams 6a and exhaust cam 7a (one each only is shown in FIG. 1) integrated therewith for opening and closing intake valves 8 and exhaust valves 9 associated therewith. The intake cam shaft 6 and the exhaust cam shaft 7 are coupled to a crank shaft 3e through driven sprockets and timing chains (neither of which are shown in FIG. 1) associated therewith, such that they are driven by the crank shaft 3e to rotate once as the crank shaft 3e rotates twice. The intake cam shaft 6 is rotatably coupled to its driven sprocket over a predetermined angular distance, so that the phase VTCACT of the intake cam 6a (hereinafter simply referred to as the "cam phase") with respect to the crank shaft 3e is changed by changing a relative angle to the driven sprocket.

The intake cam shaft 6 is provided at one end thereof with a cam phase changing mechanism (hereinafter abbreviated as "VTC") 10 and a VTC electromagnetic control valve 10a for controlling the cam phase VTCACT. The VCT 10 continuously advances or retards the cam phase VTCACT to advance or retard an open/close timing for the intake valve 8. This causes valve overlapping between the intake valve 8 and the exhaust valve 9 to increase or decrease, resulting in an increase or a decrease in the internal EGR and a change in the intake characteristics represented by the filling efficiency. The operation of the VTC 10 is controlled by controlling the position of a spool valve (not shown) of the VTC electromagnetic control valve 10a by a duty ratio DbVTC of a driving signal from the ECU 2 to thereby change a hydraulic pressure supplied to the VCT 10. Specifically, the cam phase VTCACT is controlled to advance more as the duty ratio DbVTC is larger. When the VTC 10 is stopped, the duty ratio DbTV is set to the value of zero so that the cam phase VTCACT is held at the most retard position.

A cam angle sensor (actual cam phase detecting means) 21 is disposed at the end of the intake cam shaft 6 opposite to the cam phase changing mechanism 8. The cam angle sensor 21, which is comprised, for example, of a magnet rotor and an MRE pickup, outputs a CAM signal, which is a pulse signal, every predetermined cam angle (for example, every 1°) to the ECU 2, as the intake cam shaft 6 is rotated. The ECU 2 calculates the actual cam phase VTCACT with this CAM signal and a CRK signal, later described.

Further, though not shown, each of the intake cam 6a and the exhaust cam 7a is comprised of a lower speed cam and a higher speed cam which has a higher cam profile than the lower speed cam. These lower speed cam and higher speed cam are switched by their respective cam profile switching mechanisms (hereinafter abbreviated as "VTEC") 11, thereby switching the valve timing of the intake valve 8 and the exhaust valve 9 from a lower speed valve timing (hereinafter abbreviated as "LO.VT") to a higher speed valve timing (hereinafter abbreviated as "HI.VT"), and vice versa. With HI.VT, the intake valve 8 and the exhaust valve 9 are opened for a longer period, valve overlapping of both becomes longer, and the amount of valve lift becomes larger, thereby increasing the filling efficiency. Like the VTC 10, the operation of the VTEC 11 is also controlled by controlling the VTEC electromagnetic control valve 11a by a driving signal from the ECU 2 to change a hydraulic pressure supplied to the VTEC 11.

The valve timing for the intake valve 8 and the exhaust valve 9 is set to LO.VT for lean combustion among other uniform combustion, stratified combustion and double injection combustion, later described, and switched to LO.VT or HI.VT for stoichiometric combustion and rich combustion among other uniform combustion.

A magnet rotor 22a is attached on the crank shaft 3e. The magnet rotor 22a comprises a crank angle sensor 22 together with the MRE pickup 22b. The crank angle sensor 22 (engine rotational speed detecting means) outputs a CRK signal and a TDC signal, which are pulse signals, as the crank shaft 3e is rotated.

One pulse of the CRK signal is outputted every predetermined crank angle (for example, every 30°). The ECU 2 calculates the engine rotational speed NE of the engine 3 (hereinafter referred to as the "engine rotational speed") based on the CRK signal. The TDC signal indicates that the piston 3a of each cylinder is at a predetermined crank angle position near TDC (top dead center) at the start of an intake stroke. In this embodiment implemented in a four-cylinder engine, one pulse is outputted each time the crank angle advances over 180°. The engine 3 is also provided with a cylinder discriminating sensor, not shown, which sends to the ECU 2 a cylinder discriminating signal which is a pulse signal for discriminating a cylinder. The ECU 2 determines the crank angle position of each cylinder with these cylinder discriminating signal, CRK signal and TDC signal.

An engine water temperature sensor 23 (engine temperature sensing means) is attached to the body of the engine 3. The engine water temperature 23, which may be comprised of a thermistor, detects an engine water temperature TW that indicates the temperature of cooling water circulating in the body of the engine 3, and sends a signal indicative of the detected engine water temperature TW to the ECU 2.

A throttle vale 13 is disposed in the intake pipe 12 of the engine 3. The throttle valve 13 is driven by an electrically driven motor 13a coupled thereto, so that its opening (throttle valve opening) TH is controlled. The throttle opening TH is detected by a throttle valve opening sensor 32 which sends to the ECU 2 a signal indicative of the detected throttle opening TH. The ECU 2 controls the throttle valve opening TH through the electric motor 13a in accordance with an operating state of the engine 3 to control the amount of intake air to the engine 3.

An absolute intake pipe inner pressure sensor 24 is disposed at a location of the intake pipe 12 downstream of the throttle valve 13. The absolute intake pipe inner pressure sensor 24, which may be comprised of a semiconductor pressure sensor or the like, detects an absolute intake pipe inner pressure PBA, which is the absolute pressure within the intake pipe 12, and sends to the ECU 2 a signal indicative of the detected absolute intake pipe inner pressure PBA. Also, an intake air temperature 25, which may be comprised of a thermistor or the like, is attached to the intake pipe 12 for detecting an intake air temperature TA within the intake pipe 12, and sending to the ECU 2 a signal indicative of the detected intake air temperature TA.

An EGR pipe 15 for EGR is connected between a location of the intake pipe 12 downstream of the throttle valve 13 and a location of the exhaust pipe 14 upstream of a three-way catalyst 20. An EGR control valve 16 is attached to the EGR pipe 15. The EGR control valve 16, which may be comprised of a linear electromagnetic valve, has its valve lift amount LACT linearly changed by a driving signal from the ECU 2 to control the EGR amount. The valve lift amount LACT is detected by a valve lift amount sensor 26 which sends to the ECU 2 a signal indicative of the detected valve lift amount LACT.

The ECU 2 is further supplied with a signal indicative of a detected atmospheric pressure PA from an atmospheric pressure sensor 28; a signal indicative of a detected vehicle speed (V) from a vehicle speed sensor 29 (vehicle speed detecting means); a signal indicative of a detected accelerator pedal opening AP, which is an operation amount of an accelerator pedal (not shown) from an accelerator pedal opening sensor 30 (accelerator pedal opening detecting means); and a signal indicative of a detected gear stage NGAR of an automatic transmission (not shown) of the engine 3, from a gear stage sensor 31.

In this embodiment, the ECU 2 comprises engine rotational speed detecting means, required torque determining means, fuel injection time determining means, basic ignition time determining means, actual cam phase detecting means, basic ignition time correcting means, advance direction correcting means, and retard direction correcting means. The ECU 2 is comprised of a microcomputer which includes a CPU 2a, a RAM 2b, a ROM 2c and an input/output interface (not shown). The detected signals from the aforementioned sensors 20–32 are A/D converted and reshaped in the input interface before they are inputted to the CPU 2a. The CPU 2a, in response to these input signals, executes a variety of operational processing based a control program stored in the ROM 2c, a variety of tables and maps, later described, and flag values, later described, temporarily stored in the RAM 2b, and so on.

Specifically, the CPU 2a determines an operating state of the engine 3 from the variety of detected signals, and also determines a required torque PMCMD outputted by the engine 3 based on the engine rotational speed NE and the accelerator pedal opening AP. Also, the CPU 2a sets the combustion mode of the engine 3 to the stratified combustion mode during an extremely low load operation such as idling and to the uniform combustion mode during an operation other than the extremely low load operation, and executes a double injection combustion mode at a transition between the two combustion modes. In addition, the CPU 2a calculates an optimal fuel injection period Tout for each determined combustion mode, determines an injection end timing IJLOGD of the fuel injection period, and controls the ignition time IG based on the Tout value and the engine rotational speed NE.

In the stratified combustion mode of the two combustion modes, the throttle valve 13 is controlled to remain in a substantially full open state, while a fuel is injected from the injector 4 into the combustion chamber 3c during a compression stroke, with a majority of the injected fuel striking the recess 3d to form a fuel jet stream. An air/fuel mixture is generated from this fuel jet stream and an intake air flow from the intake pipe 12. With the piston 3a positioned near the top dead center in the compression stroke, the fuel is burnt in an extremely leaner air/fuel ratio A/F (for example, in a range of 27 to 60) than the stoichiometric air/fuel ratio while the air/fuel mixture is distributed dominantly near the ignition plug 5.

In the uniform combustion mode, on the other hand, the throttle valve opening TH is controlled to an opening in accordance with the required torque PMCMD, the engine rotational speed NE and so on, and the fuel is injected into the combustion chamber 3c during an intake stroke. This causes combustion to be performed in a richer air/fuel ratio A/F (for example, in a range of 12 to 22) than in the stratified combustion mode with an air/fuel mixture produced from a fuel jet stream and an air flow uniformly distributed in the combustion chamber 3c.

Further, in the double injection combustion mode, the fuel is injected in an intake stroke and a compression stroke, respectively, of one combustion cycle, to perform combustion in a transient air/fuel ratio A/F (for example, in a range of 14.7 to 30) state.

FIGS. 2 through 5 are flow charts illustrating a program executed by the ECU 2 to calculate the basic ignition time IGMAP for the ignition time IG in synchronism with the generation of a TDC signal. The basic ignition time IGMAP is a basic value of the ignition time IG, and actually, though details are omitted, the ignition time IG is eventually determined by correcting the calculated basic ignition time IGMAP with a variety of correcting terms using the engine water temperature TW and so on as parameters.

First, in the illustrated program, the ECU 2 determines at step 11 (in the figure, labeled as "S11." This abbreviation is applied similarly in the following steps) whether or not a double injection combustion mode flag F_CMOD is "1." If the answer is YES, i.e., when the engine 3 is in the double injection mode, the ECU 2 searches an IGM_DB map (not shown) for the double injection combustion mode to find a basic map value IGMAPm in accordance with the engine rotational speed EN and the injection end timing IJLOGD (step 12). Next, the ECU 2 sets this basic map value IGMAPm as the basic ignition time IGMAP (step 13), followed by termination of this program.

If the answer at step 11 is NO, the ECU 2 determines the value of a combustion mode monitor S_EMOD (step 14). The combustion mode monitor S_EMOD is set to "0" when the engine 3 is in a stoichiometric combustion mode among other uniform combustion modes; to "1" when in a lean combustion mode among other uniform combustion modes; and to "2" when in a stratified combustion mode, respectively. When the result of determination at step 14 shows S_EMOD=0, i.e., the stoichiometric combustion mode, the ECU 2 determines whether or not a VTEC flag F_VTEC is "1" (step 15). If the answer is YES, the ECU 2 further determines whether or not an EGR flag F-EGR is "1" (step 16). If the answer at step 16 is NO, i.e., when the valve timing is set to HI.VT and EGR is stopped, the ECU 2 searches an IGM_STH map (not shown) for HI.VT/EGR stop to find the basic map value IGMAPm in accordance with the engine rotational speed NE and a required torque PMCMD (step 17), and then the program proceeds to step 31, later described.

If the answer at step 16 is YES, the ECU 2 searches an IGM_SOH map (not shown) for HI.VT/EGR execution, which is provided separately from the IGM_STH map, to find the basic map value IGMAPm in accordance with the NE value and PMCMD value (step 18), and then the program proceeds to step 31, later described.

On the other hand, if the answer at step 15 is NO, i.e., when the valve timing is set to LO.VT, the ECU 2 determines whether or not an idle flag F_IDLE is "1" (step 19). If the answer at step 19 is YES, i.e., when the engine 3 is idling, the ECU 2 searches an IGIDLT table (not shown) for idle operation to find a table value IGIDLTn in accordance with a target idle rotational speed NOBJ (step 20), and sets this table value IGIDLTn as a basic map value IGMAPm (step 21).

If the answer at step 19 is NO, i.e., when the engine 3 is not idling, the ECU 2 determines whether or not the EGR flag F_EGR is "1" (step 22). If the answer at step 22 is YES, the ECU 2 searches the IGM_STH map used at step 17 to find the basic map value IGMAPm for LO.VT/EGT execution in accordance with the engine rotational speed NE and the required torque PMCMD (step 23). On the other hand, if the answer at step 22 is NO, the ECU 2 searches an IGM_SOL map (not shown) for LO.VT/EGR stop, which is provided separately from the IGM_STH map and IGM_SOH map, to find the basic map value IGMAPm in accordance with the NE value and PMCMD value (step 24).

Figure 2:
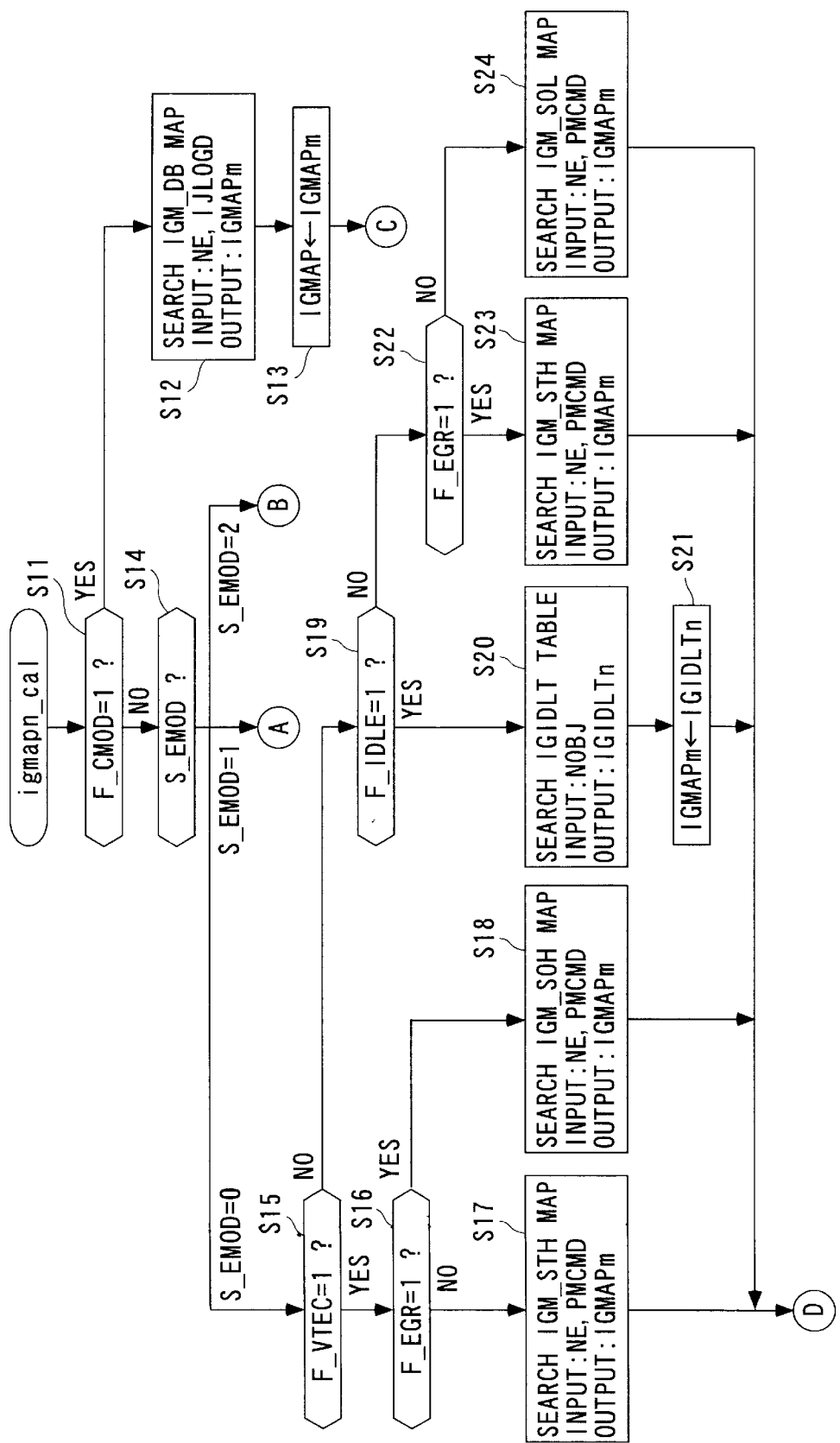
FIGS. 2 through 5 are flow charts illustrating together a program executed by a controller in FIG. 1 for calculating a basic ignition time.
Figure 3:
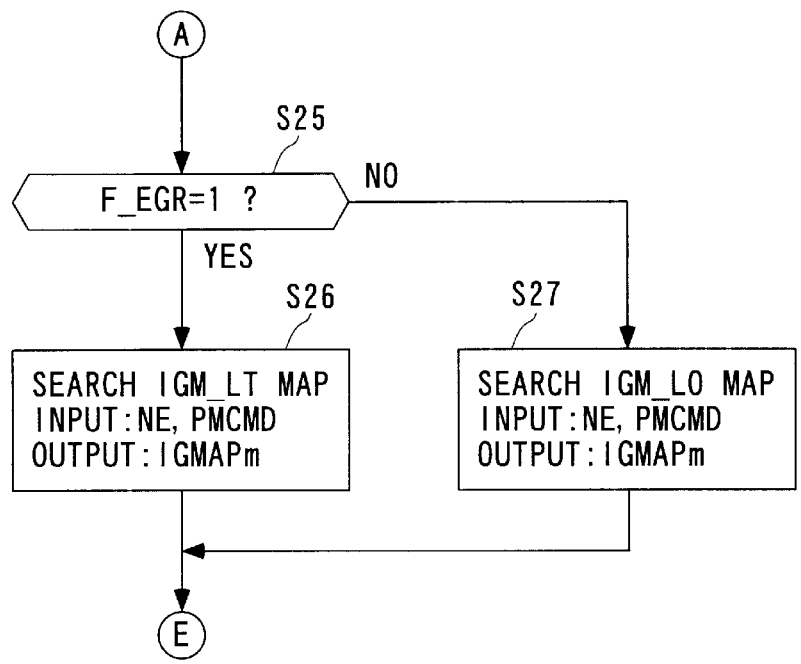

On the other hand, when the result of determination at step 14 shows the combustion mode monitor S_EMOD=1, i.e., when the engine 3 is in the lean combustion mode among other uniform combustion modes, the program proceeds to step 25 in FIG. 2, where the ECU 2 determines whether or not the EGR flag F_EGR is "1." If the answer at step 25 is YES, the ECU 2 searches an IGM_LT map (not shown) for lean combustion/EGR execution to find the basic map value IGMAPm in accordance with the engine rotational speed NE and the required torque PMCMD (step 26). On the other hand, if NO, the ECU 2 searches an IGM-LO map (not shown) for lean combustion/EGR stop, which is provided separately from the IGM_LT map, to find the basic map value GMAPm in accordance with the NE value and PMCMD value (step 27).

Figure 4:
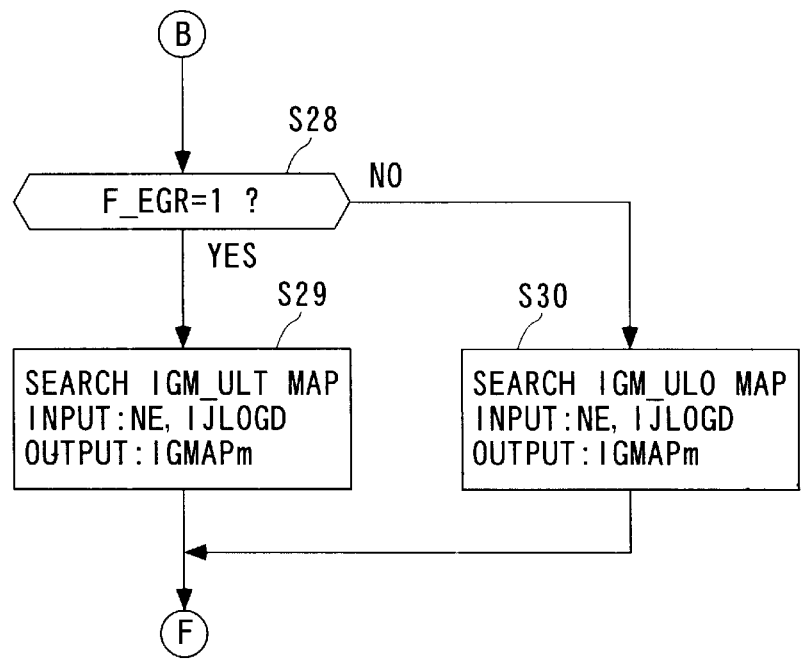

Further, when the result of determination at step 14 shows the combustion mode monitor S_EMOD=2, i.e., when the engine 3 is in the stratified combustion mode, the program proceeds to step 28 in FIG. 4, where the ECU 2 determines whether or not the EGR flag F_EGR is "1." If the answer at step 28 is YES, the ECU 2 searches an IGM_ULT map (not shown) for stratified combustion/EGR execution to find the basic map value IGMAPm in accordance with the engine rotational speed NE and the injection end timing IJLOGD (step 29). On the other hand, if NO, the ECU 2 searches an IGM_ULO map (not shown) for stratified combustion/EGR stop, which is provided separately from the IGM_ULT map, to find the basic map value IGMAPm in accordance with the NE value and IJLOGD value (step 30).

In the foregoing manner, the basic map value IGMAPm is set with the engine rotational speed NE and the required torque PMCMD as parameters when the engine 3 is in any of the uniform combustion modes (stoichiometric combustion mode and lean combustion mode), except that the engine 3 is idling, and is set with the engine rotational speed NE and the injection end timing IJLOGD as parameters in the stratified combustion mode.

After setting the basic map value IGMAPm in the manner described above, the ECU 2 calculates an EGR correcting value IGKEGR at step 31. Though detailed description is omitted, the EGR correcting value IGKEGR is provided for compensating for a change in the amount of intake air due to a change in EGR amount.

Next, the ECU 2 determines whether or not a cam phase deviation DVTC, which is the difference between the detected actual cam phase (hereinafter referred to as the "actual cam phase") VTCACT and the target cam phase VTCCMD (DVTC=VTCACT−VTCCMD) is larger than its upper limit predetermined value DVTCLMTH (positive value) and smaller than its lower limit value DVTCLMTL (negative value), respectively (steps 32, 33). If one of the answers at steps 32, 33 is YES, i.e., when DVTC>DVTCLMTH or DVTC<DVTCLMTL stands, showing that there is a large difference between the actual cam phase VTCACT and the target cam phase VTCCMD, the program proceeds to step 34, where the ECU 2 calculates a VTC correcting value IGVTC, in a manner described later. Next, the ECU 2 adds the EGR correcting value IGKEGR and the VTC correcting value respectively calculated at steps 31, 34, to the basic map value IGMAPm which has been found as described above to calculate the basic ignition time IGMAP (step 35), followed by termination of this program.

On the other hand, if the answers at both steps 32 and 33 are NO, i.e., when DVTCLMTL≦DVTC≦DVTCLMTH stands, showing that the cam phase deviation DVTC is within a predetermined range, the ECU 2 sets the VTC correcting value IGVTC to zero (step 36), and then executes the aforementioned step 35, followed by termination of this program. In other words, when there is a small difference between the actual cam phase VTCACT and the target cam phase VTCCMD, no correction is made in accordance with the cam phase deviation DVTC.

Figure 5:
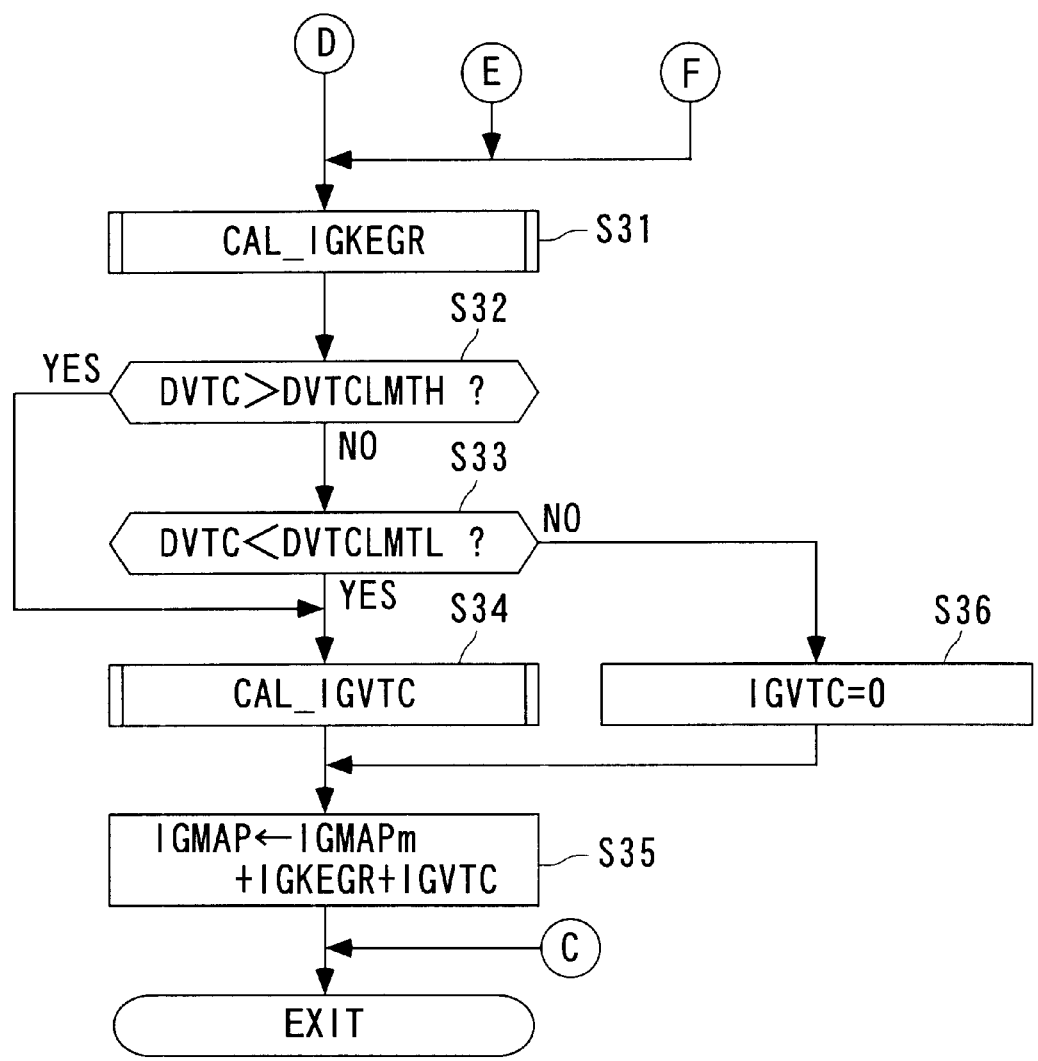
Figure 6:
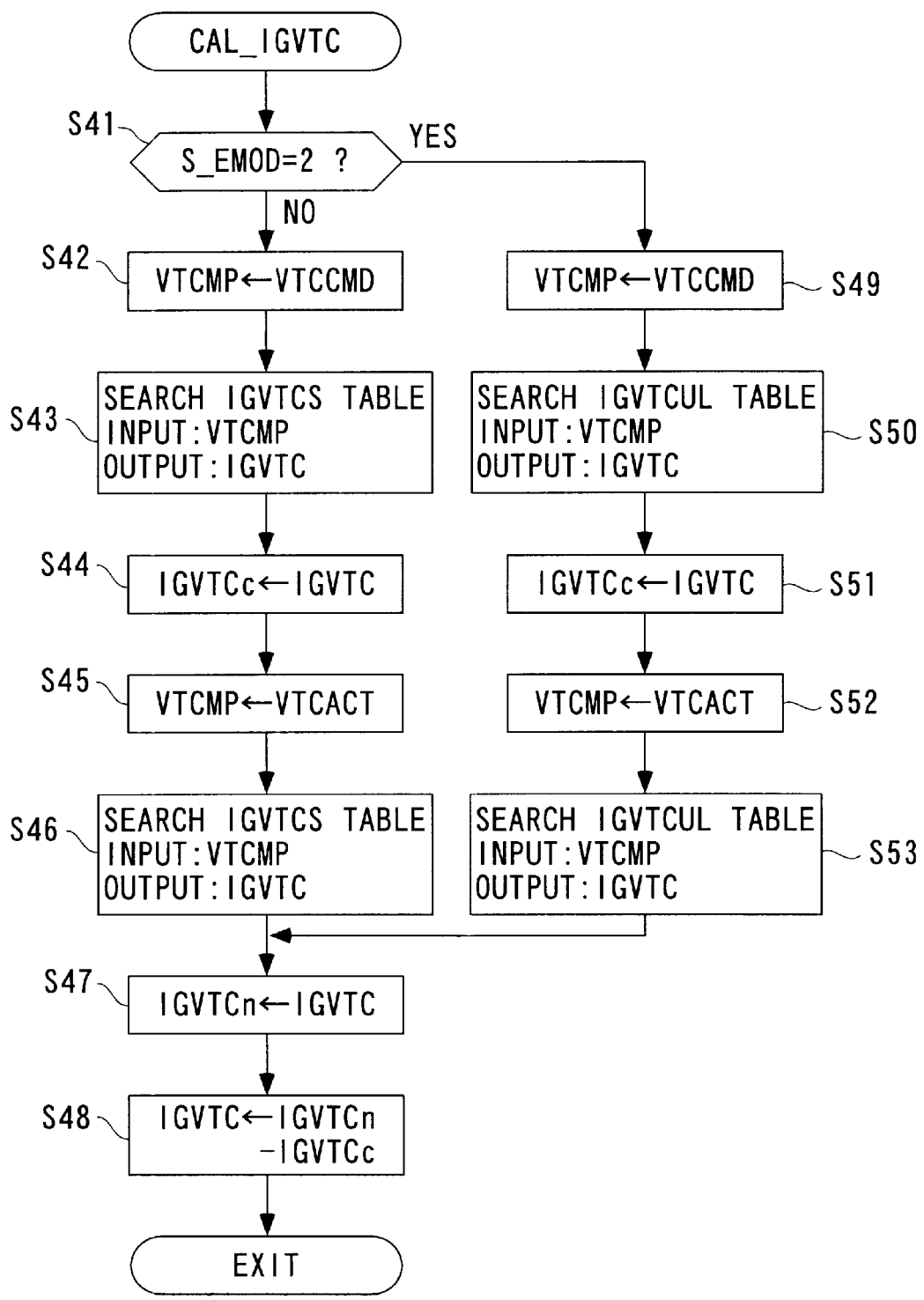
FIG. 6 is a flow chart illustrating a subroutine executed in the program of FIG. 2 for calculating a VTC correction value.

FIG. 6 illustrates a subroutine for calculating the VTC correcting value IGVTC, executed at step 34 in FIG. 5. In this subroutine, the ECU 2 first determines at step 41 whether or not the combustion mode monitor S_EMOD is "2." If the answer at step 41 is NO, i.e., when the engine 3 is in any of the uniform combustion modes (stoichiometric combustion mode or lean combustion mode), the ECU 2 sets the target cam phase VCTCMD as a search cam phase value VTCMP (step 42), and searches an IGVTCS table for the uniform combustion mode to find the VTC correcting value IGVTC in accordance with the search cam phase value VTCMP (step 43).

Figure 7:
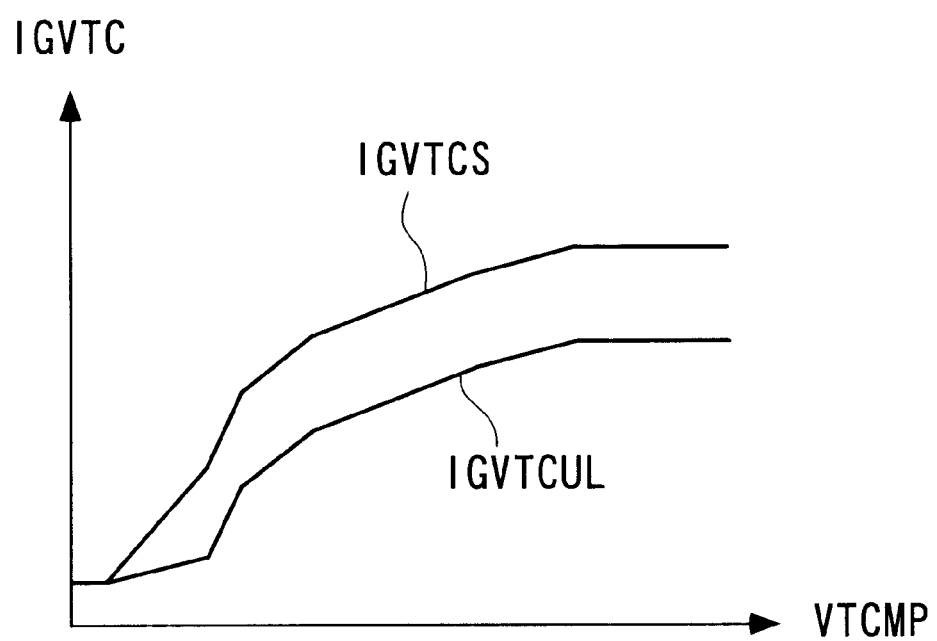
FIG. 7 shows an example of an IGVTCS table and an IGVTUL table used in the subroutine of FIG. 6.

FIG. 7 shows an example of the IGVTC table for the uniform combustion modes, where the VTC correction value IGVTC is set to a larger value as the search cam phase value VTCMP is larger. This is because a larger cam phase exerts a larger influence on the ignition time IG so that a larger value is used to compensate for this influence. Next, the ECU 2 sets the found VTC correcting value IGVTC as a target cam phase correction term IGVTCc corresponding to the target cam phase VTCCMD (step 44).

Next, the ECU 2 sets the actual cam phase VCTACT as the search cam phase value VTCMP (step 45), and searches the IGVTCS table to find the VTC correcting value IGVTC in accordance with the search cam phase value VTCMP, similarly to the aforementioned step 43 (step 46). Next, the ECU 2 sets the found VTC correcting value IGVTC as an actual cam phase correction term IGVTCn corresponding to the actual cam phase VTCACT (step 47). Finally, the ECU 2 subtracts the target cam phase correction term IGVTCc set at step 44 from the actual cam phase correction term IGVTCn (IGVTCn−IGVTCc) to derive the VTC correcting value IGVTC (step 48), followed by termination of this subroutine.

In the foregoing manner, the VTC correcting value is set as a difference between the actual cam phase correction term IGVTCn corresponding to the actual cam phase VTCACT and the target cam phase correction term IGVTCc corresponding to the target cam phase VTCACT. Also, as described above, the VTC correcting value IGVTC is used as an addition term for calculating the basic ignition time IGMAP at step 35. Therefore, the basic ignition time IGMAP is corrected in the advance direction when the actual cam phase VTCACT is larger than the target cam phase VTCACT (on the advance side), and corrected in the retard direction when smaller (on the retard side). The magnitude of the correction depends on the difference between the actual cam phase VTCACT and the target cam phase VTCACT (cam phase deviation DVTC).

On the other hand, if the answer at step 41 is YES, i.e., when the engine 3 is in the stratified combustion mode, the ECU 2 calculates the VTC correcting value IGVTC using the IGVTCUL table for the stratified combustion mode, which is provided separately from the IGVTCS table, at step 49 onward in a manner similar to the aforementioned steps 42–48. Specifically, the ECU 2 first sets the target cam phase VCTCMD as the search cam phase value VTCMP (step 49), and searches the IGVTCUL table for the stratified combustion mode to find the VTC correcting value IGVTC in accordance with the search cam phase value VTCMP (step 50), and sets the found VTC correcting value IGVTC as the target cam phase correction term IGVTCc (step 51).

FIG. 7 additionally shows an example of the IGVTCUL table for the stratified combustion mode, where the VTC correcting value IGVTC is set to a larger value as the search cam phase value VTCMP is larger, as is the case with the uniform combustion mode, and is set to a smaller value than in the uniform combustion mode. This is because, as described above, the ignition time IG is largely affected by a change in the internal EGR amount and effective compression ratio associated with a change in the cam phase VTCACT in the uniform combustion mode, whereas the ignition time IG is less affected by the cam phase VTCACT but rather largely affected by a fuel injection time in the stratified combustion mode, so that the basic ignition time IGMAP is corrected using a correcting amount adapted to the characteristics of the respective modes.

Next, the ECU 2 sets the actual cam phase VCTACT as the search cam phase value VTCMP (step 52), and searches the IGVTCUL table to find the VTC correcting value IGVTC in accordance with the search cam phase value VTCMP (step 53). Next, the subroutine proceeds to the aforementioned steps 47 and 48, where the ECU 2 sets the VTC correcting value IGVTC as the actual cam phase correction term IGVTCn, and calculates the difference between the actual cam phase correction term IGVTCn and the target cam phase correction term IGVTCC set at step 51 as the VTC correcting value, as is the case with the uniform combustion mode, followed by termination of this subroutine.

In the foregoing manner, according to this embodiment, the basic map value IGMAPm for the basic ignition time IGMAP is determined based on the engine rotational speed NE and the required torque PMCMD in the uniform combustion mode, and determined based on the engine rotational speed NE and the injection end timing IJLOGD in the stratified combustion mode, so that the basic map value IGMAPm can be stably and appropriately set in the respective combustion modes without significantly affected by a change in the intake characteristics associated with a change in the cam phase VCTACT. Also, since the basic map value IGMAPm thus determined is corrected in accordance with the cam phase deviation DVTC between the actual cam phase VCTACT and the target cam phase VCTCMD, the ignition time IG can be set such that it rapidly converges to an optimal value corresponding to the actual intake characteristics associated with a change in the cam phase VCTACT.

Further, when the cam phase deviation DVTC is larger than the upper limit predetermined value DVTCLMTH or smaller than the lower limit predetermined value DVTCLMTL, the basic map value IGMAPm is corrected in a direction corresponding to a direction in which the actual cam phase VTCACT deviates from the target cam phase VTCCMD, so that the ignition timing IG can be more appropriately set in accordance with the direction and degree of an actual deviation of the cam phase VTCACT. In addition, when the actual cam phase VTCACT has a small amount of deviation so that the cam phase deviation DVTC is within the range between tue upper and lower limit predetermined values DVTCLMTH, DVTCLMTL, no correction is made in accordance with the cam phase deviation DVTC, so that the stability of the ignition time IG can be maintained.

Further, the basic map value IGMAPm is corrected with a correcting value retrieved from the IGVTCS table in the uniform combustion mode, while the basic map value IGMAPm is corrected with a smaller correcting value retrieved from the different IGVTCS table, thereby making it possible to appropriately set the ignition time IG corresponding to the magnitude of influence exerted by the cam phase VTCACT on the ignition time IG in both the uniform combustion mode and the stratified combustion mode.

As described above, the ignition time controller for an internal combustion engine according to the present invention can set the ignition time such that it rapidly converges to an appropriate value in accordance with a change in the intake characteristics associated with a change in the cam phase in either of the uniform combustion mode and the stratified combustion mode in a direct injection type internal combustion engine having a cam phase changing mechanism.

What is claimed is:

1. An ignition time controller for an internal combustion engine equipped with a cam phase changing mechanism for changing a cam phase with respect to a crank shaft for at least one of an intake cam for opening/closing an intake valve and an exhaust cam for opening/closing an exhaust valve such that the cam phase reaches a target cam phase so that said engine is operated in a combustion mode switched between a uniform combustion mode in which a fuel is injected into a cylinder during an intake stroke and a stratified combustion mode in which a fuel is injected into a cylinder in a compression stroke, said ignition time controller comprising:

engine rotational speed detecting means for detecting a rotational speed of said internal combustion engine;

accelerator pedal opening detecting means for detecting an opening of an accelerator pedal;

required torque determining means for determining a required torque outputted by said internal combustion engine based on the detected engine rotational speed and accelerator pedal opening;

fuel injection time determining means for determining a time at which a fuel is injected into said cylinder;

basic ignition time determining means for determining a basic ignition time based on said engine rotational speed and said determined required torque when said engine is in said uniform combustion mode, and for determining the basic ignition time based on said engine rotational speed and said determined fuel injection time when said engine is in said stratified combustion mode;

actual cam phase detecting means for detecting an actual cam phase; and ignition time correcting means for correcting said basic ignition time in accordance with a cam phase deviation which is a difference between the detected actual cam phase and said target cam phase.

2. An ignition time controller for an internal combustion engine according to claim 1, wherein said basic ignition time correcting means includes advance direction correcting means for correcting said basic ignition time in an advance direction when said cam phase deviation is larger than an upper limit predetermined value.

3. An ignition time controller for an internal combustion engine according to claim 1, wherein said basic ignition time correcting means includes retard direction correcting means for correcting said basic ignition time in a retard direction when said cam phase deviation is smaller than a lower limit predetermined value.

4. An ignition time controller for an internal combustion engine according to claim 2, wherein said basic ignition time correcting means includes retard direction correcting means for correcting said basic ignition time in a retard direction when said cam phase deviation is smaller than a lower limit predetermined value.

5. An ignition time controller for an internal combustion engine according to claim 1, wherein said basic ignition time correcting means corrects said basic ignition time with different correcting amounts when said engine is in said uniform combustion mode and when said engine is in said stratified combustion mode.

6. An ignition time controller for an internal combustion engine according to claim 1, wherein said engine includes a fuel injection valve for injecting the fuel, said fuel injection valve being disposed in a central portion of a top wall of a combustion chamber of said cylinder for injecting the fuel toward a recess formed in a piston.

7. An ignition time controller for an internal combustion engine equipped with a cam phase changing mechanism for changing a cam phase with respect to a crank shaft for at least one of an intake cam for opening/closing an intake valve and an exhaust cam for opening/closing an exhaust valve such that the cam phase reaches a target cam phase so that said engine is operated in a combustion mode switched between a uniform combustion mode in which a fuel is injected into a cylinder during an intake stroke and a stratified combustion mode in which a fuel is injected into a cylinder in a compression stroke, said ignition time controller comprising:

an engine rotational speed detecting module for detecting a rotational speed of said internal combustion engine;

an accelerator pedal opening detecting module for detecting an opening of an accelerator pedal;

a required torque determining module for determining a required torque outputted by said internal combustion engine based on the detected engine rotational speed and accelerator pedal opening;

a fuel injection time determining module for determining a time at which a fuel is injected into said cylinder;

a basic ignition time determining module for determining a basic ignition time based on said engine rotational speed and said determined required torque when said engine is in said uniform combustion mode, and for determining the basic ignition time based on said engine rotational speed and said determined fuel injection time when said engine is in said stratified combustion mode;

an actual cam phase detecting module for detecting an actual cam phase; and an ignition time correcting module for correcting said basic ignition time in accordance with a cam phase deviation which is a difference between the detected actual cam phase and said target cam phase.

8. An ignition time controller for an internal combustion engine according to claim 7, wherein said basic ignition time correcting module includes an advance direction correcting module for correcting said basic ignition time in an advance direction when said cam phase deviation is larger than an upper limit predetermined value.

9. An ignition time controller for an internal combustion engine according to claim 7, wherein said basic ignition time correcting module includes a retard direction correcting module for correcting said basic ignition time in a retard direction when said cam phase deviation is smaller than a lower limit predetermined value.

10. An ignition time controller for an internal combustion engine according to claim 8, wherein said basic ignition time correcting module includes a retard direction correcting module for correcting said basic ignition time in a retard direction when said cam phase deviation is smaller than a lower limit predetermined value.

11. An ignition time controller for an internal combustion engine according to claim 7, wherein said basic ignition time correcting module corrects said basic ignition time with different correcting amounts when said engine is in said uniform combustion mode and when said engine is in said stratified combustion mode.

12. An ignition time controller for an internal combustion engine according to claim 7, wherein said engine includes a fuel injection valve for injecting the fuel, said fuel injection valve being disposed in a central portion of a top wall of a combustion chamber of said cylinder for injecting the fuel toward a recess formed in a piston.

13. An ignition time control method for an internal combustion engine equipped with a cam phase changing mechanism for changing a cam phase with respect to a crank shaft for at least one of an intake cam for opening/closing an intake valve and an exhaust cam for opening/closing an exhaust valve such that the cam phase reaches a target cam phase so that said engine is operated in a combustion mode switched between a uniform combustion mode in which a fuel is injected into a cylinder during an intake stroke and a stratified combustion mode in which a fuel is injected into a cylinder in a compression stroke, said method comprising the steps of:

detecting a rotational speed of said internal combustion engine;

detecting an opening of an accelerator pedal;

determining a required torque outputted by said internal combustion engine based on the detected engine rotational speed and accelerator pedal opening;

determining a time at which a fuel is injected into said cylinder;

determining a basic ignition time based on said engine rotational speed and said determined required torque when said engine is in said uniform combustion mode, and determining the basic ignition time based on said engine rotational speed and said determined fuel injection time when said engine is in said stratified combustion mode;

detecting an actual cam phase; and correcting said basic ignition time in accordance with a cam phase deviation which is a difference between the detected actual cam phase and said target cam phase.

14. An ignition time control method for an internal combustion engine according to claim 13, wherein said step of correcting said basic ignition time includes correcting said basic ignition time in an advance direction when said cam phase deviation is larger than an upper limit predetermined value.

15. An ignition time control method for an internal combustion engine according to claim 13, wherein said step of correcting said basic ignition time includes correcting said basic ignition time in a retard direction when said cam phase deviation is smaller than a lower limit predetermined value.

16. An ignition time control method for an internal combustion engine according to claim 14, wherein said step of correcting said basic ignition time includes correcting said basic ignition time in a retard direction when said cam phase deviation is smaller than a lower limit predetermined value.

17. An ignition time control method for an internal combustion engine according to claim 13, wherein said step of correcting said basic ignition includes correcting said basic ignition time with different correcting amounts when said engine is in said uniform combustion mode and when said engine is in said stratified combustion mode.

18. An ignition time control method for an internal combustion engine according to claim 13, wherein said engine includes a fuel injection valve for injecting the fuel, said fuel injection valve being disposed in a central portion of a top wall of a combustion chamber of said cylinder for injecting the fuel toward a recess formed in a piston.

19. An engine control unit including a control program for causing a computer to carry out ignition time control for an internal combustion engine equipped with a cam phase changing mechanism for changing a cam phase with respect to a crank shaft for at least one of an intake cam for opening/closing an intake valve and an exhaust cam for opening/closing an exhaust valve such that the cam phase reaches a target cam phase so that said engine is operated in a combustion mode switched between a uniform combustion mode in which a fuel is injected into a cylinder during an intake stroke and a stratified combustion mode in which a fuel is injected into a cylinder in a compression stroke, wherein said control program causes said computer to detect a rotational speed of said internal combustion engine; detect an opening of an accelerator pedal; determine a required torque outputted by said internal combustion engine based on the detected engine rotational speed and accelerator pedal opening; determine a time at which a fuel is injected into said cylinder; determine a basic ignition time based on said engine rotational speed and said determined required torque when said engine is in said uniform combustion mode, and determining the basic ignition time based on said engine rotational speed and said determined fuel injection time when said engine is in said stratified combustion mode; detect an actual cam phase; and correct said basic ignition time in accordance with a cam phase deviation which is a difference between the detected actual cam phase and said target cam phase.

20. An engine control unit according to claim 19, wherein when said control program causes said computer to correct said basic ignition time, said control program causes said computer to correct said basic ignition time in an advance direction when said cam phase deviation is larger than an upper limit predetermined value.

21. An engine control unit according to claim 19, wherein when said control program causes said computer to correct said basic ignition time, said control program causes said computer to correct said basic ignition time in a retard direction when said cam phase deviation is smaller than a lower limit predetermined value.

22. An engine control unit according to claim 20, wherein when said control program causes said computer to correct said basic ignition time, said control program causes said computer to correct said basic ignition time in a retard direction when said cam phase deviation is smaller than a lower limit predetermined value.

23. An engine control unit according to claim 19, wherein when said control program causes said computer to correct said basic ignition time, said control program causes said computer to correct said basic ignition time with different correcting amounts when said engine is in said uniform combustion mode and when said engine is in said stratified combustion mode.

24. An engine control unit to claim 19, wherein said engine includes a fuel injection valve for injecting the fuel, said fuel injection valve being disposed in a central portion of a top wall of a combustion chamber of said cylinder for injecting the fuel toward a recess formed in a piston.

* * * * *